(12) United States Patent
Nettleton et al.

(10) Patent No.: US 10,557,709 B2
(45) Date of Patent: Feb. 11, 2020

(54) METHOD OF SURVEYING AND A SURVEYING SYSTEM

(71) Applicant: Technological Resources Pty Ltd, Melbourne, VIC (AU)

(72) Inventors: Eric William Nettleton, Brisbane (AU); Charles Benjamin McHugh, Brisbane (AU); Annette Pal, Brisbane (AU)

(73) Assignee: Technological Resources Pty Ltd, Melbourne (AU)

( * ) Notice: Subject to any disclaimer, the term of this patent is extended or adjusted under 35 U.S.C. 154(b) by 506 days.

(21) Appl. No.: 14/088,487

(22) Filed: Nov. 25, 2013

(65) Prior Publication Data

US 2014/0149039 A1 May 29, 2014

(30) Foreign Application Priority Data

Nov. 27, 2012 (AU) ................................ 2012905196

(51) Int. Cl.
*G01C 15/00* (2006.01)

(52) U.S. Cl.
CPC .................................... *G01C 15/00* (2013.01)

(58) Field of Classification Search
CPC ...................................................... G01C 15/00
See application file for complete search history.

(56) References Cited

U.S. PATENT DOCUMENTS

| | | | | |
|---|---|---|---|---|
| 5,631,658 A | * | 5/1997 | Gudat | A01B 79/005 342/357.31 |
| 6,047,227 A | * | 4/2000 | Henderson | E02F 9/2045 172/4.5 |
| 2008/0208415 A1 | * | 8/2008 | Vik | E21C 41/26 701/50 |
| 2009/0202109 A1 | * | 8/2009 | Clar | G01C 15/00 382/104 |
| 2009/0256412 A1 | * | 10/2009 | Nieto | E21C 39/00 299/18 |
| 2010/0141518 A1 | | 6/2010 | Hersey et al. | |
| 2012/0136525 A1 | * | 5/2012 | Everett | E02F 9/2045 701/24 |

(Continued)

FOREIGN PATENT DOCUMENTS

| | | |
|---|---|---|
| AU | 2010249186 | 7/2011 |
| KR | 100728377 | 6/2007 |

(Continued)

OTHER PUBLICATIONS

Australian Application 2012905196, International Search Report, dated Jan. 10, 2013.

*Primary Examiner* — Manuel L Barbee
*Assistant Examiner* — Raymond L Nimox
(74) *Attorney, Agent, or Firm* — Banner & Witcoff, Ltd.

(57) ABSTRACT

A surveying system 10 includes a data storage system 12 containing survey data defining a terrain model 14 of a region 16. A processor module 18 is configured to interrogate the data storage system 12 automatically to assess characteristics of the survey data to determine whether or not the survey data require updating and to provide instructions automatically to scanning equipment 26, 28 to scan the region 16 to provide updated survey data to the processor module 18 to enable the processor module 18 to update the terrain model 14.

30 Claims, 2 Drawing Sheets

(56) References Cited

U.S. PATENT DOCUMENTS

2012/0150573 A1    6/2012  Soubra
2014/0081611 A1*  3/2014  Robertson ........... G06F 17/5009
                                                703/6

FOREIGN PATENT DOCUMENTS

| WO | 2009109006 | 9/2009 |
| WO | 2010031128 | 3/2010 |
| WO | 2012051665 | 4/2012 |
| WO | 2012116392 | 9/2012 |

* cited by examiner

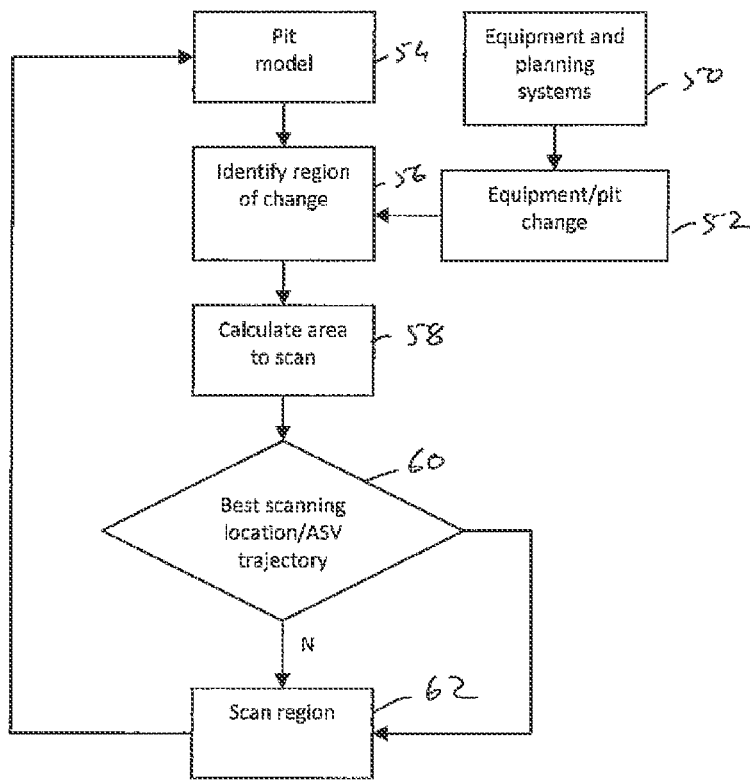
Fig. 2
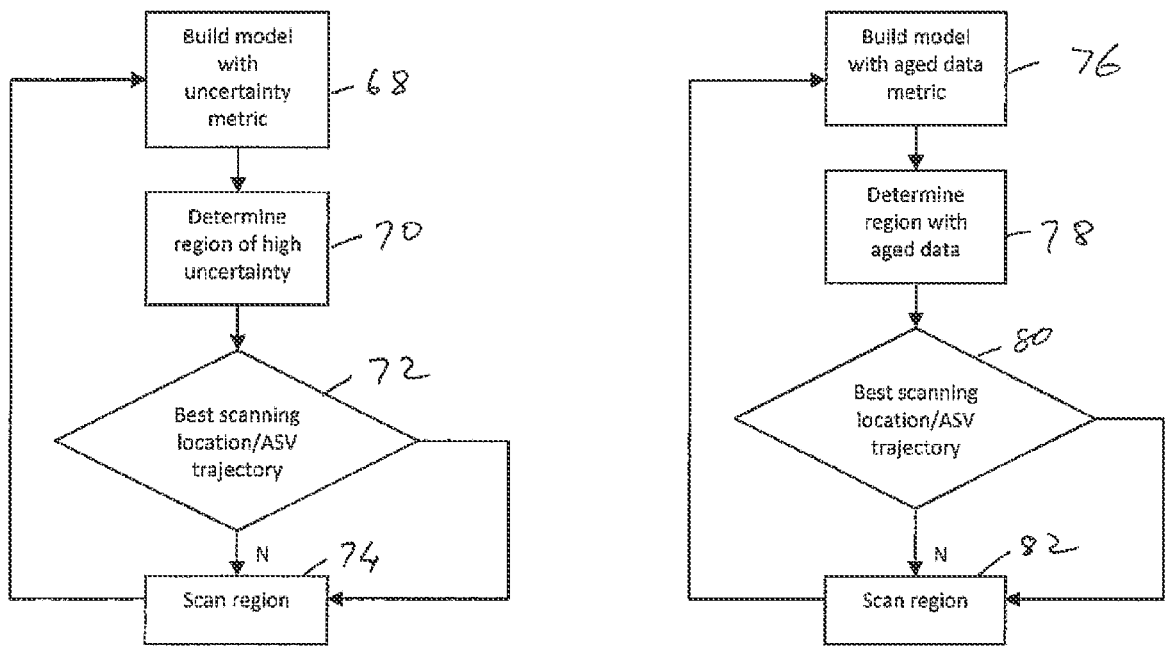
Fig. 3
Fig. 4

METHOD OF SURVEYING AND A SURVEYING SYSTEM

CROSS-REFERENCE TO RELATED APPLICATIONS

The present application claims priority from Australian Provisional Patent Application No 2012905196 filed on 27 Nov. 2012, the contents of which are incorporated by reference in this specification in their entirety.

FIELD

This disclosure relates, generally, to surveying terrain and, more particularly, to a method of surveying and to a surveying system. While the disclosure has particular application to the field of mining, it will be appreciated that the disclosure is applicable in any application where surveying of terrain is carried out.

BACKGROUND

Current terrain surveying systems are manually operated and rely on decisions of surveyors. While these systems use sensors such as lasers to gather terrain data, the surveyor does large scale data collection rather than only scanning specific regions that require updating. This results in a large volume of extraneous data being collected.

The timeliness of the data gathering is also limited by the surveyor's ability to get into an area of interest and to scan the relevant regions.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

In a first aspect, there is provided, a method of surveying which includes automatically assessing characteristics of survey data defining a terrain model of a region to determine whether or not the survey data require updating;

if updated survey data are required, automatically surveying the terrain to generate updated survey data; and updating the terrain model using the updated survey data.

In this specification, unless the context clearly indicates otherwise, the following words have the meanings assigned to them:

"characteristics" means changes related to previously obtained survey data or quality of survey data previously obtained.

"quality of the survey data" means quality of survey data relating to, inter alia, areas of the terrain about which information is sparse and/or age of the survey data at locations of the terrain.

"automatically" means a system decision and not an operator decision.

In one embodiment, the method may include assessing at least one of the quality of the survey data and the age of the survey data in assessing whether or not to update the survey data. When the survey data are entered into a data storage system, the survey data may be time-stamped. The method may include monitoring the time stamp of the survey data and, when a predetermined period of time has passed, causing the survey data to be updated to replace aged survey data relating to the relevant region of the terrain.

In another embodiment, the method may include using information relating to activities in or proximate the region in assessing whether or not to update the survey data. Thus, the method may include monitoring activities of equipment in or proximate the region.

The activities may relate to mining operations and the method may include using changes in or proximate the region resulting from mining activities to determine where scanning needs to occur to obtain updated survey data.

The method may include controlling sensors associated with the region to scan the region to obtain updated survey data. The method may include using fixed point sensors to scan the region. The method may include causing the fixed point sensors to scan the region automatically.

The method may include using at least one mobile sensor pack to scan the region. The method may include conveying the at least one mobile sensor pack on an autonomous platform. In addition, or instead, the method may include conveying the at least one mobile sensor pack on a non-autonomous platform with sensors of the at least one mobile sensor pack operating automatically.

In a second aspect, there is provided a surveying system which includes a data storage system containing survey data defining a terrain model of a region; and a processor module configured to interrogate the data storage system automatically to assess characteristics of the survey data defining a terrain model of a region to determine whether or not the survey data require updating and to provide instructions automatically to scanning equipment to scan the region to provide updated survey data to the processor module to enable the processor module to update the terrain model.

The processor module may be configured to assess at least one of the quality of the survey data and the age of the survey data in assessing whether or not to update the survey data. The survey data in the data storage system may be time-stamped on being input into the data storage system to enable the age of the survey data to be monitored.

The processor module may be configured to receive information relating to activities in or proximate the region to enable the processor module to determine whether or not to update the survey data. The activities may relate to mining operations, the processor module using changes in or proximate the region resulting from the mining activities to determine where scanning needs to occur to obtain updated survey data.

The system may include the scanning equipment which is responsive to instructions from the processor module to scan the region automatically and to provide the updated survey data to the processor module. The scanning equipment may include a plurality of sensors associated with the region to scan the region to obtain updated survey data. The scanning sensors may include fixed point sensors for scanning the region. At least some of the fixed point sensors may be configured to scan the region automatically.

The sensors may include at least one mobile sensor pack to scan the region. The at least one mobile sensor pack may be mounted on an autonomous platform. In addition, or instead, the at least one mobile sensor pack may be mounted on a non-autonomous platform with sensors of the at least one mobile sensor pack being configured to operate automatically.

The disclosure extends to software that, when installed on a computer, causes the computer to perform the method described above.

BRIEF DESCRIPTION OF DRAWINGS

Embodiments of the disclosure are now described by way of example with reference to the accompanying drawings in which:

FIG. 2 shows a flow chart of a first embodiment of a method of surveying;

FIG. 3 shows a flow chart of a second embodiment of a method of surveying; and

FIG. 4 shows a flow chart of a third embodiment of a method of surveying.

DETAILED DESCRIPTION OF EXEMPLARY EMBODIMENTS

Figure 1:
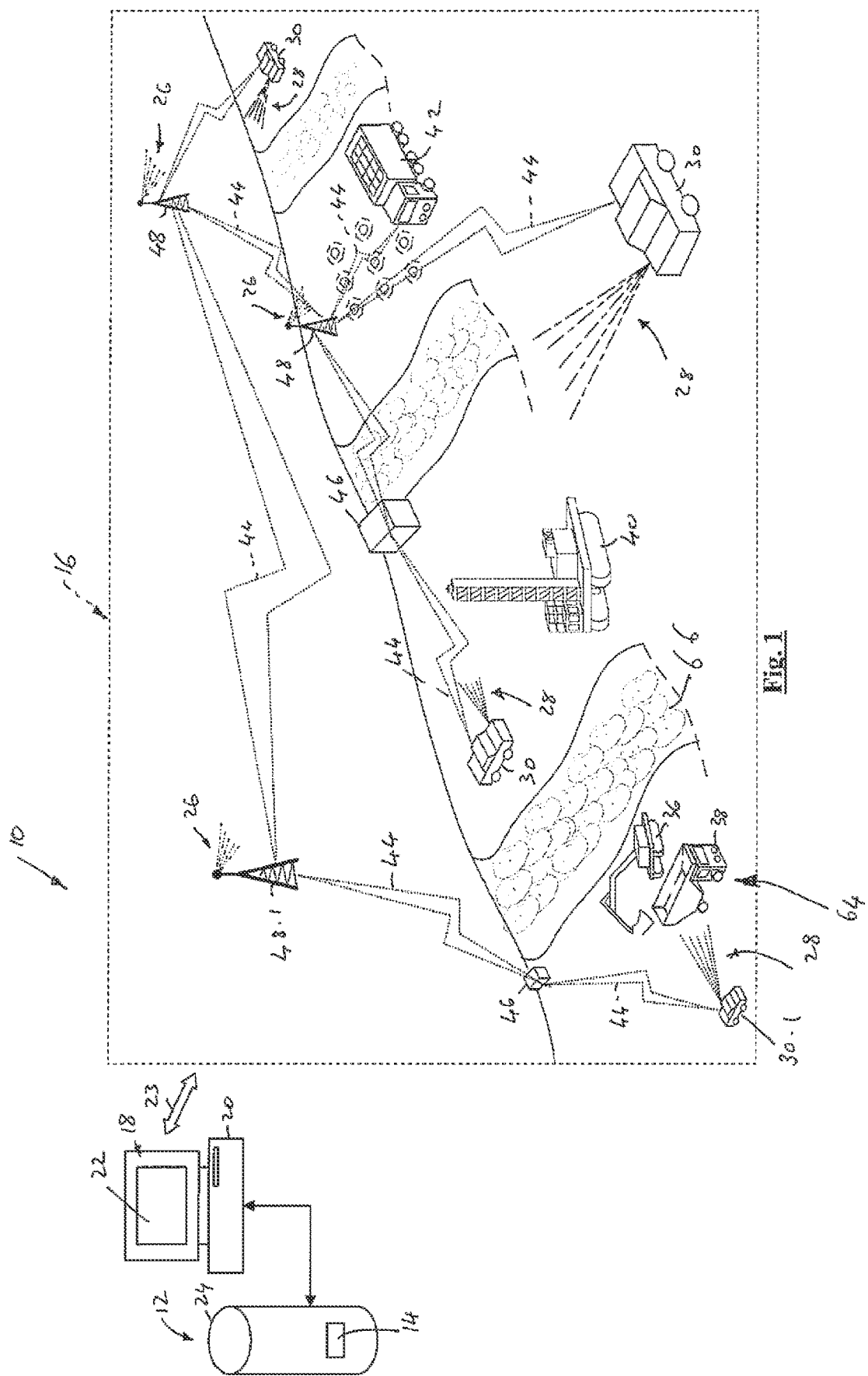
FIG. 1 shows a schematic representation of an embodiment of a surveying system.

In the drawings, reference numeral 10 generally designates an embodiment of a surveying system. The surveying system 10 will be described below with reference to its application in the field of mining Those skilled in the art will, however, appreciate that the surveying system 10 could be used in other applications where surveying is to be carried out. In addition, for ease of explanation, the system 10 will be described with reference to its application to surface mining. Once again, it will be appreciated, that the system 10, suitably modified if necessary, could be used in underground mining applications as well.

The system 10 comprises a data storage system 12 containing a terrain model 14 of a region in the form of a mine site 16. The terrain model 14 is made up of survey data of the mine site 16.

The data storage system 12 communicates with a processor module which, conveniently, is implemented as a computing system 18. The computing system 18 has a central processing unit 20 and a display 22 for displaying information relating to the terrain model 14. The computing system 18 communicates with equipment at the mine site 16, as shown schematically by arrows 23, and as will be discussed in greater detail below. Further, the computing system 18 has inputting devices such as keyboards, pointing devices, or the like, associated with it. The computing system 18 also includes conventional memory modules (not shown) which contain operating instructions for the computing system 18.

The computing system 18 is located remote from the mine site 16, typically out of line of sight of the mine site 16. For example, the computing system 18 could be located in a mine office associated with the mine site 16 or could be located at a remote operations centre which controls the mine site 16.

While the data storage system 12 is illustrated as being in the same location as the computing system 18, it will be appreciated that the data storage system 12 could be located remotely with respect to the computing system 18. In addition, the computing system 18 itself could be a distributed computing system.

The data storage system 12 comprises a database structure, or database, 24 which contains the terrain model 14. Further, as will be described below, the database 24 is configured to store measurement, or survey, data from scanning equipment used with the system 10 and associated with the mine site 16.

The terrain model 14 can be generated in any one of a number of ways. Suitable methods for generating the terrain model 14 are described, for example, in International Patent Publication No. WO 2010/031128 dated 18 Sep. 2009 and entitled "A method and system of data modelling" and International Patent Publication No. WO 2012/051665 dated 21 Oct. 2011 and entitled "Method for large scale, non-reverting and distributed spatial estimation", both of which are in the name of The University of Sydney. Both of these applications are incorporated in this specification in their entirety by reference.

The system 10 includes scanning equipment in the form of fixed scanning sensors 26 and scanning sensors 28 mounted on mobile platforms 30 (referred to below where necessary as "mobile sensors"). Each mobile platform 30 is in the form of an autonomous vehicle which is able to be dispatched by the computing system 18 to a part of the mine site 16 where it is required or necessary to update the survey data. Each scanning sensor 26, 28 is, typically, a laser scanner such as an LMS Z420 time-of-flight laser scanner available from Riegl. The sensors 26, 28 could, instead or in addition, be radar scanners.

The fixed sensors 26 are configured to operate automatically upon receipt of a suitable control command from the computing system 18. In other words, the computing system 18 determines the direction in which the relevant sensor/s 26 should scan and issues the command to the sensor/s 26 without operator intervention.

In the case of the mobile sensors 28, in addition to, or instead of the mobile sensors being mounted on autonomous vehicles 30, at least some mobile sensors 28 are mounted on non-autonomous platforms or vehicles such as excavators 36, load haul dump trucks 38, drills 40 or blast hole charging trucks 42. In the case where a mobile sensor 28 is mounted on a non-autonomous vehicle, the mobile sensor 30 is configured to operate automatically to scan the relevant region of the mine site 16 as the vehicle traverses the region. For example, the mobile sensor is oriented to scan in the correct direction under the control of the computing system 18 and without operator intervention.

The sensors 26, 28 provide geometric information relating to the mine site 16. This is, generally, sufficient information to enable the terrain model 14 to be created, and to be used by mobile mining machinery, in particular, mobile mining machinery which is operated autonomously and/or by remote control. If desired, the system 10 could also be operable to obtain geological data using appropriate sensors such as hyperspectral imaging sensors.

It will be appreciated that where mobile mining machinery is used autonomously, or controlled remotely, an accurate model of the terrain is required and needs to be updated regularly to ensure that the terrain model is maintained in an up to date, accurate state. In addition, accurate survey data of the mine site 16 enable the mine site to be operated more efficiently and, consequently, more productively.

Hence, the computing system 18 is configured automatically to interrogate the database 24 periodically to assess characteristics of the survey data defining the terrain model 14 to determine whether or not the survey data require updating. The characteristics of the survey data which are assessed by the computing system 18 include changes to previously obtained survey data relating to regions of the mine site 16 resulting from mining activities or quality of the survey data previously obtained for the terrain model 14. The quality of the survey data includes areas of the terrain of the mine site 16 about which information is uncertain or sparse and/or age of the survey data defining the, or parts of, the terrain model 14.

To enable the computing system 18 to monitor the age of the terrain model 14, all survey data, when entered into the database 24 of the data storage system 12, are time stamped by the computing system 18. When the computing system 18, for example, determines that the data are older than a predetermined age, the computing system 18 is configured to re-scan those parts of the mine site 16 having the aged survey data, as will be described in greater detail below.

The computing system 18 communicates with mobile mining machinery on the mine site 16, such as the excavators 36, the dump trucks 38, the drilling equipment 40 and the blast hole charging trucks 42, as shown schematically by arrows 44. In this way, the computing system 18 is able to determine when a change occurs at a region or regions of the mine site 16. Examples of changes are: after blasting has occurred, when excavation of blasted material occurs and/or when excavated material has been removed from a region of the mine site 16.

Data from the mobile machinery and the sensors 26, 28 are transmitted via relay stations 46 and communications equipment on masts 48. While the masts 48 are shown as having the fixed sensors 26, these masts could also be used for relaying communications between the mining equipment on the mine site 16 and the computing system 18. Instead, the communications equipment could be carried on dedicated masts 48 with the fixed sensors 26 being mounted on different, dedicated masts (not shown).

A first embodiment of the operation of the system is described with reference to the flow chart of FIG. 2 of the drawings. This embodiment relates to the situation where a change occurs at the mine site 16.

The computing system 18 communicates with equipment and planning systems associated with the mine site 16, as shown at step 50 in FIG. 2 of the drawings. The equipment and planning systems are incorporated in the data storage system 12 or, instead, are stored in a separate data storage structure associated with the mine site 16 or a larger mining complex of which the mine site 16 forms a part.

As indicated above, the computing system 18 also receives information from the mobile mining machinery operating in the mine site 16 and, using this information and data from the equipment and planning systems, is able to determine where there has been a change to a region of the mine site 16. The computing system 18 is also operable to detect change by changes to equipment characteristics such as operational status, position, or the like, as shown at step 52.

The system 10 accesses the terrain model 14 (labelled in the flow chart as a "pit model") associated with the mine site 16, as shown at step 54. At step 56, the computing system 18 computes where in the mine site a change of terrain has occurred and, at step 58, computes the area of the mine site 16 to be scanned to obtain updated survey data associated with the changed terrain.

As shown at step 60, the computing system 18 optionally determines which sensors 26, 28 to use to achieve the best scan of the terrain changed region. This decision step is optional as there will be situations where it is readily apparent which sensors 26, 28 are to be used. For example, where changes occur in the mine site 16 at a position which is not in line of sight of any fixed sensors 26, where changes occur which are out of range of the fixed sensors 26 or where the computing system 18 determines that the data from the fixed sensors 26 alone are inadequate to obtain a comprehensive survey of the terrain, the computing system 18 will deploy one or more autonomous vehicles 30 carrying the mobile sensors 28.

In other situations, the computing system 18 is able to determine which fixed sensors 26 are adequate for the task at hand and no decision needs to be made as to where the best scanning location is or whether or not mobile sensors 28 need to be deployed.

When a determination has been made that mobile sensors 28 are to be used, the computing system 18 is operative to dispatch one or more autonomous vehicles 30 to the relevant region of the mine site 16 to scan the region to update the survey data of that region using the mobile sensors 28. Dispatching of the autonomous vehicle/s 30 occurs automatically under the control of the computing system 18 without any operator intervention. It will be appreciated however that, in the case of an emergency or under other relevant circumstances, an operator is always able to override the computing system 18, whether to halt the deployment of the autonomous vehicle/s 30 or to assume remote control over the autonomous vehicle/s 30.

As shown at step 62, once the sensors 26 and/or 28 have been selected, those sensors 26, 28 scan the region. The survey data generated by the sensors 26, 28 are transmitted to the computing system 18 which uses the updated survey data to update the terrain model 14 to provide an updated terrain model 14.

The computing system 18 is, thus, able to determine that updated survey data are required for the terrain model and is configured to obtain the updated data.

Referring now to FIG. 3 of the drawings, a second embodiment of the operation of the surveying system 10 is described. In this embodiment, the computing system 18 interrogates the survey data relating to the terrain model 14 stored in the database 24 of the data storage system 12 to determine whether or not data relating to any parts of the terrain model are sparse or incomplete. An example of sparse data of the terrain model 14 is shown at region 64 of the mine site 16 in FIG. 1 of the drawings. This region 64 depicts the situation where, when the vehicle 30 was surveying a bench face 66 of the mine site 16 to generate survey data relating the bench face 66, the bench face 66 was occluded by an excavator 36 and a dump truck 38 so that data relating to part of the bench face 66 were not captured by the mobile sensor 28.

In this embodiment, as an initial step, step 68, the computing system 18 generates a model with an uncertainty metric relating to sparsity of data associated with the terrain model 14. The computing system 18 then determines region/s of the mine site 16 containing sparse data, as shown at step 70.

Step 72 of this embodiment is the same optional decision step as described in step 60 of the first embodiment of FIG. 2 of the drawings. For example, considering the region 64 of the mine site 16 in FIG. 1 of the drawings, the computing system 18 may determine that the bench face 66 cannot be adequately scanned by the fixed sensor 26 on the mast 48.1 and that it will, consequently, be necessary to deploy an autonomous vehicle 30.1 to scan the bench face 66 using a mobile sensor 28. It is assumed that, at the time the scan occurs, the excavator 36 and the haul truck 38 will have moved away from the bench face 66 so that the bench face 66 is no longer occluded by those vehicles 36, 38. If the computing system 18 determines that the autonomous vehicle 30 is to be deployed, this is, once again, effected automatically by the computing system 18 without the intervention of an operator.

Once the computing system 18 has selected the appropriate sensor/s 26, 28, scanning of the region/s of the mine site 16 with high uncertainty occurs as shown at step 74. The scanned survey data are communicated to the computing system 18. The computing system 18 updates the model with the uncertainty metric using the scanned survey data and, in so doing, updates the terrain model 14 with the updated survey data so that uncertainty associated with the terrain model 14 is minimised.

A further embodiment of the operation of the system 10 is now described with reference to FIG. 4 of the drawings. As described above, when the survey data relating to the mine site 16 are input into the terrain model 14 in the data storage system 12, the data are time-stamped so that the age of the stored survey data can be monitored. In this embodiment, the computing system 18 periodically interrogates the terrain model 14 to determine the age of the survey data making up the terrain model 14.

Resulting from this interrogation, the computing system 18 generates a model with an aged data metric as shown at step 76. From this model, the computing system 18 determines which regions of the mine site 16 are to be scanned to enable the aged survey data of the terrain model 14 associated with those regions to be updated with new, updated survey data as shown at step 78.

At step 80 an optional decision step is made by the computing system 18 to determine which sensors 26, 28 should be used to scan the relevant region/s of the mine site 16. The reasons for including this step are the same as those set out above with reference to step 60 in the embodiment described above with reference to FIG. 2 of the drawings.

Once the computing system 18 has selected the appropriate sensor/s 26, 28, scanning of the identified region/s of the mine site 16 occurs as shown at step 82. The scanned survey data are communicated to the computing system 18. The computing system 18 updates the model with the aged data metric using the scanned survey data and, in so doing, updates the terrain model 14 with the up to date survey data so that, once again, uncertainty associated with the terrain model 14 is minimised.

While the system 10 and method have been described above with reference to three different embodiments, it will be appreciated that the system 10 and method could be used in other circumstances as well. For example, it is readily understood that geological formations may give differing results when surveyed while wet and while dry. Hence, the computing system 18 could be configured to assess under what weather conditions surveying occurred and, if necessary, take remedial action to improve the accuracy of the surveyed data when the computing system 18 detects anomalies. Other circumstances where the system 10 and method are applicable will be apparent to those of skill in the field.

It is an advantage of the described embodiments that a system 10 and method are provided which provide, in effect, "real time" updates of survey data to enable the terrain model 14 to be maintained in an updated, accurate state. The system 10 and method reduce the delay in collecting the data and decrease the need to have dedicated vehicles and personnel in the mine site 16 by optimising the data acquisition process. Further, the system 10 automatically determines when the survey data require updating and can effect the updating of the survey data without operator intervention. This is particularly beneficial in the case where autonomous vehicles are operating in the mine site 16 where such vehicles require accurate to terrain data to traverse the mine site 16 autonomously.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of surveying a mine during mining operations, the mine including survey data defining a terrain model of at least a region of the mine, the method comprising:

mounting a plurality of fixed scanning sensors in selected regions in the mine and scanning sensors on mobile platforms movable to selected regions within the mine, each sensor configured to operate automatically upon receipt of a suitable control command from a computing system;

automatically monitoring the survey data defining the terrain model of the region of the mine, the survey data being stored in a data storage system;

automatically interrogating the data storage system to determine whether or not the survey data of a specific part of the region require updating by automatically assessing the quality of the survey data of the specific part of the region, the assessment based on at least one of information from equipment and planning systems relating to mining operations, equipment presence, and feedback from equipment activities in carrying out mining operations in the specific part of the region of the mine, the equipment communicating activity data to the computing system;

if any survey data of the specific part of the region are determined to require updating, having the computing system determine where in the mine a change of terrain has occurred and determine which of the plurality of sensors to use to scan the specific part of the region where the change of terrain has occurred;

automatically sending by the computing system a suitable command to the selected sensors to obtain the required updated survey data, automatically using the selected sensors to survey the specific part of the region to generate updated survey data, and communicating the updated survey data to the computer system;

updating the terrain model using the updated survey data; and controlling operation of mobile mining machinery based on the updated terrain model.

2. The method of claim 1 wherein monitoring the survey data includes assessing at least one of the quality of the survey data of the specific part of the region and the age of the survey data of the specific part of the region in assessing whether or not to update the survey data.

3. The method of claim 1 wherein using information from planning systems includes using information relating to mining activities in or proximate the specific part of the region in assessing whether or not to update the survey data.

4. The method of claim 1 wherein using equipment activities includes monitoring activities of equipment in or proximate the specific part of the region.

5. The method of claim 4 wherein the equipment activities relate to the mining operations and the method includes using changes in or proximate the specific part of the region resulting from the mining operations undertaken by the equipment in determining where scanning needs to occur to obtain updated survey data of the specific part of the region.

6. The method of claim 1 further comprising using the fixed point scanning sensors to scan the specific part of the region.

7. The method of claim 6 further comprising causing the fixed point scanning sensors to scan the specific part of the region automatically.

8. The method of claim 1 wherein the scanning sensors mounted on mobile platforms comprise at least one mobile sensor pack to scan the specific part of the region.

9. The method of claim 8 further comprising conveying the at least one mobile sensor pack on an autonomous mobile platform.

10. The method of claim 8 further comprising conveying the at least one mobile sensor pack on a non-autonomous mobile platform with sensors of the at least one mobile sensor pack operating automatically.

11. A mine surveying system for surveying a mine during mining operations comprising
   a plurality of fixed point scanning sensors mounted in selected regions in the mine and scanning sensors mounted on mobile platforms movable to selected regions within the mine, each sensor configured to operate automatically upon receipt of a suitable control command;
   a data storage system containing survey data defining a terrain model of a region of the mine;
   a processor module configured to interrogate the data storage system automatically to monitor the survey data to determine whether or not the survey data of a specific part of the region require updating by automatically assessing the quality of the survey data of the specific part of the region, the processor module being configured to base its assessment on at least one of information from equipment and planning systems relating to mining operations, equipment presence and feedback from equipment activities in carrying out mining operations in the specific part of the region of the mine, the equipment communicating activity data to the processor module; and
   the processor module further being configured to select which of the sensors of the scanning equipment are to be used to scan the specific part of the region if the processor module determines that any survey data require updating based on a change of terrain, and to provide instructions automatically to the scanning equipment to cause the selected sensors to scan the specific part of the region to provide updated survey data to the processor module to enable the processor module to update the terrain model using the updated survey data; and
   mobile mining machinery configured to be controlled based on the updated terrain.

12. The system of claim 11 wherein the processor module is configured to assess at least one of the quality of the survey data of the specific part of the region and the age of the survey data of the specific part of the region in assessing whether or not to update the survey data.

13. The system of claim 12 wherein the survey data in the data storage system are time-stamped on being input into the data storage system to enable the age of the survey data to be monitored.

14. The system of claim 11 wherein the processor module is configured to receive the information from planning systems which relates to activities in or proximate the region to enable the processor module to determine whether or not to update the survey data.

15. The system of claim 11 wherein the equipment activities include activities relating to the mining operations, the processor module using changes in or proximate the specific part of the region resulting from the equipment activities to determine where scanning needs to occur to obtain updated survey data.

16. The system of claim 11 wherein the fixed point scanning sensors are selected for scanning the region.

17. The system of claim 16 wherein at least some of the fixed point scanning sensors are configured to scan the region automatically.

18. The system of claim 11 wherein the scanning sensors mounted on mobile platforms include at least one mobile sensor pack to scan the region.

19. The system of claim 18 wherein the at least one mobile sensor pack is mounted on an autonomous mobile platform.

20. The system of claim 18 wherein the at least one mobile sensor pack is mounted on a non-autonomous mobile platform with sensors of the at least one mobile sensor pack being configured to operate automatically.

21. Software that, when installed on a computer, causes the computer to perform the method of claim 1.

22. The method of claim 1 wherein using equipment activities includes detecting changes in equipment characteristics.

23. The method of claim 22 wherein detecting changes in equipment characteristics includes detecting changes in at least one of operational status and position of the equipment.

24. The method of claim 1 wherein the scanners are laser scanners and/or radar scanners.

25. The method of claim 10 wherein the non-autonomous mobile platform is selected from excavators, load haul dump trucks, drills, or blast hole charging trucks.

26. The system of claim 11 wherein the processor module further being configured to determine the direction in which the sensors should scan and issues commands to the sensors without operator intervention.

27. The method of claim 1 further comprising operating the mobile mining machinery by enabling the mobile mining machinery to be used in at least one of an autonomous state and a remote controlled state in the mine.

28. The system of claim 11 wherein the system is configured to operate the mobile mining machinery by enabling the mobile mining machinery to be used in at least one of an autonomous state and a remote controlled state in the mine.

29. A method of automatically surveying a mine during mining operations, the mine being associated with a data storage system containing survey data defining a terrain model of at least a region of the mine, the method comprising:
   mounting a plurality of fixed point scanning sensors in selected regions in the mine and scanning sensors on mobile platforms movable to selected regions within the mine, each sensor configured to operate automatically upon receipt of a suitable control command from a computing system;
   automatically assessing the quality of the survey data of a specific part of the region, the assessing comprising having the computing system interrogate the data storage system to analyze the survey data of the specific region of the mine based on at least one of information from equipment and planning systems relating to mining operations, equipment presence, and feedback from equipment activities in carrying out mining operations in the specific part of the region of the mine;

if updated survey data are required, based on any survey data being at least one of: (i) sparse, (ii) incomplete, and (iii) older than a predetermined age based on timestamps associated with the survey data, then having the computing system automatically determine which of the plurality of sensors to use to scan the specific part of the region where the updated survey data are required;

automatically sending by the computing system a suitable command to the selected sensors to obtain updated survey data and automatically using the selected sensors to survey the specific part of the region to generate updated survey data; and updating the terrain model using the updated survey data to facilitate operation of mobile mining machinery in the mine.

30. The method of claim 29 further comprising controlling operation of mobile mining machinery based on the updated terrain model.

* * * * *